United States Patent [19]

Robinson

[11] Patent Number: 4,509,097
[45] Date of Patent: Apr. 2, 1985

[54] CONTROL UNIT INDIVIDUALLY SERVING TWO ADJACENT PASSENGERS

[75] Inventor: Ronnie D. Robinson, Mission Viejo, Calif.

[73] Assignee: EECO Incorporated, Santa Ana, Calif.

[21] Appl. No.: 538,463

[22] Filed: Oct. 3, 1983

Related U.S. Application Data

[63] Continuation-in-part of Ser. No. 273,712, Jun. 15, 1981, abandoned.

[51] Int. Cl.³ ............................................. H05K 5/02
[52] U.S. Cl. .................... 361/395; 297/194; 307/10 R; 361/358; 361/399
[58] Field of Search ............... 361/331, 380, 429, 334, 361/356, 358, 395, 397, 399, 422; 340/52 R, 693; 297/194, 330, 411; 307/10 R; 179/1 B, 1 DD; 174/72 A; 339/17 LC; 338/128, 130, 131

[56] References Cited

U.S. PATENT DOCUMENTS

| | | | |
|---|---|---|---|
| 4,038,585 | 7/1977 | Wolski | 361/334 |
| 4,052,103 | 10/1977 | Jones | 361/397 |
| 4,060,295 | 11/1978 | Tomkiewicz | 339/17 LC |
| 4,122,357 | 10/1978 | Sumida | 174/72 A |
| 4,190,284 | 2/1980 | Schmidhuber | 297/194 |

FOREIGN PATENT DOCUMENTS

| | | | |
|---|---|---|---|
| 559424 | 8/1957 | Belgium | 297/411 |
| 2851858 | 5/1979 | Fed. Rep. of Germany | 174/72 A |
| 1229394 | 3/1971 | United Kingdom | 174/72 A |
| 2032229 | 3/1980 | United Kingdom | 179/1 B |

OTHER PUBLICATIONS

EECO-In-Flight Audio Entertainment Service Equipment, EECO, Santa Ana, Cal., 6/1981.

Primary Examiner—G. P. Tolin
Attorney, Agent, or Firm—Harry R. Lubcke

[57] ABSTRACT

One passenger control unit to individually serve two adjacently seated passengers that is affixable to a seat arm disposed between the two passengers. A structural interface frame may provide facile removable attachment of the control unit to the seat arm. Each housing unit has a set of controls on opposite sides to allow individual passenger control of plural services. Only one housing, one internal printed circuit board, and one cable are required for two passengers, thus accomplishing a significant saving in weight. The passenger control unit may form a lower or an upper forward part of the seat arm.

12 Claims, 8 Drawing Figures

CONTROL UNIT INDIVIDUALLY SERVING TWO ADJACENT PASSENGERS

This is a continuation-in-part of application, Ser. No. 06/273,712 filed June 15, 1981, now abandoned.

BACKGROUND OF THE INVENTION

This invention pertains to control elements conveniently disposed with respect to a person.

Prior passenger control units have been individual to each seat in a vehicle, typically in an airplane. For a pair of seats this required two housings, two connecting cables, and two sets of connectors.

A single seat arm has heretofore been fabricated with "outlets for individual headphones" on each side of the arm. However, other controls required to form a passenger control unit have not been shown nor suggested.

SUMMARY OF THE INVENTION

In vehicles such as airplanes a constant effort is made to reduce the weight of all permanent installations therein.

A passenger control unit ("PCU") for accomplishing electrical control has been disposed in the arm of an airplane seat for over two decades. These have been individual to each seat.

Herein, one passenger control unit is disposed in the arm that is located between a pair of seats. One set of controls is disposed on each side of the one housing. The controls near each passenger carry out the desires of that passenger.

Because only one hollow housing is required, one cable leading therefrom, and one connector in the cable, the weight is reduced to nearly one-half of what it would be for two individual control units. There are many seats in an airplane; thus, the reduction of weight is of commercial significance.

A lightweight frame may act as a structural interface between the seat arm and the control unit.

DETAILED DESCRIPTION OF THE PREFERRED EMBODIMENTS

Figure 1:
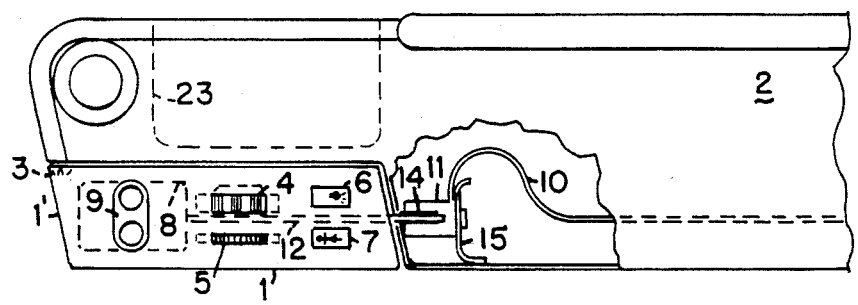
FIG. 1 is a side elevation view of an under-arm embodiment of the invention, showing pertinent internal structure.

In FIG. 1, numeral 1 identifies the exterior of the hollow housing. It may be injection molded of Noryl. It has a quasi-rectangular parallelopiped shape. An oblique forward end 1' of the housing allows a continuation of the contour of the forward part of the seat arm.

The housing is attached to seat arm 2 by mechanical fasteners 3. These may be screws and nut-plates, preferably located within the housing.

Figure 7:
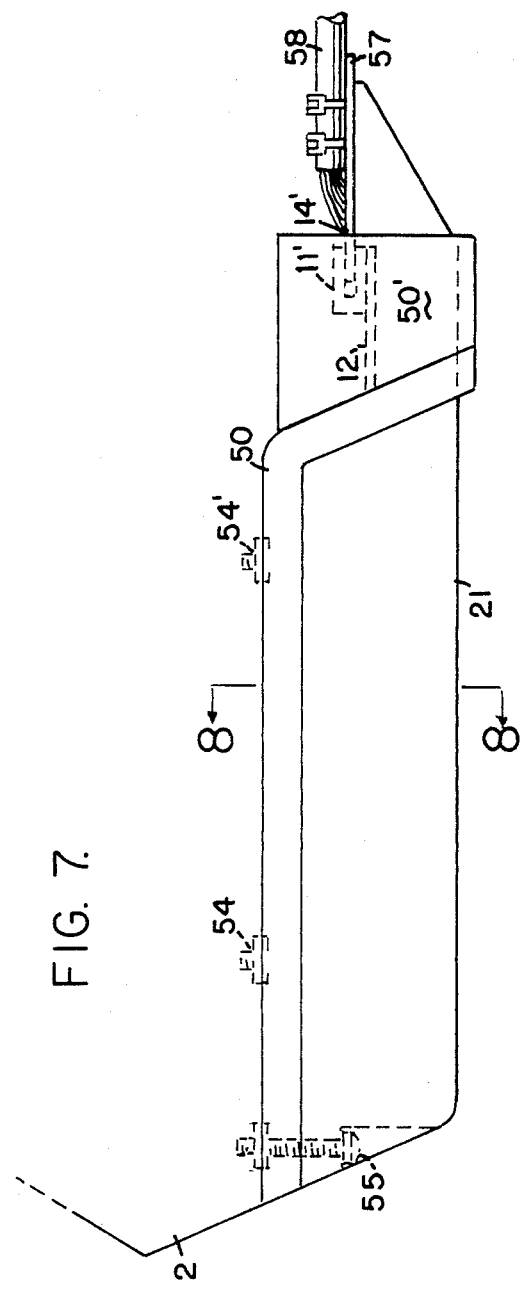
FIG. 7 is a side elevation view of an alternate embodiment utilizing a structural frame interface.

Alternately, frame 50 is provided as a structural interface between passenger control unit 1 and seat arm 2. This interface allows rapid and convenient installation and removal of the control unit despite mechanical inaccuracies of the seat arm. Frame 50 is preferably frabricated of diecast aluminum alloy in order to be both light-weight and rigid. It follows the same profile shape of the control unit and the seat arm with which it is used. As this is shown in FIG. 7, this would be the embodiment of FIG. 2.

The frame is fastened to the seat arm in any convenient manner, such as the floating self-locking nut mounting screw assembly 54, 54', etc. The locking nut is secured to the seat arm and a flat-head mounting screw passes through the frame and into the locking nut. Typically four spaced such fasteners are used. A fifth such assembly is preferably disposed at the front of the control unit-frame-seat arm combination, and a long mounting screw 55 is used to secure the control unit in place. To remove the control unit it is only necessary to unfasten this one screw and slide the unit forward.

The lower part of frame 50 has a groove 51, typically extending the full length of the control unit, which unit has a longitudinal projecting bead 52. This arrangement makes it possible to slide the control unit in and out of the frame.

Figure 8:
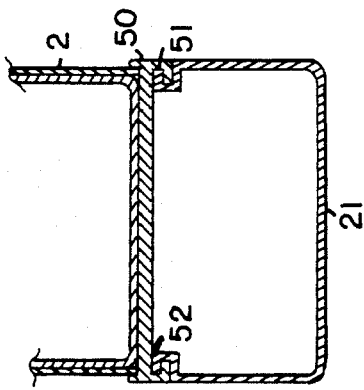
FIG. 8 is a sectional end view of the frame of FIG. 7 along section lines 8—8 in FIG. 7.

The preferable arrangement shown in FIG. 8 has a groove and bead on each side of the structures involved; although a single central groove-bead arrangement is possible.

The rear part of frame 50' preferably follows the same profile of the control unit, 1, 21, etc., with the seat arm relieved to receive the same.

Directly behind that is small printed-circuit board platform 57, upon which is mounted the external wiring seat harness cable 58. This cable goes elsewhere in the vehicle and nearby is contained within the seat arm.

Female card edge type connector 11' is mounted internally within the control unit, and is affixed to the printed circuit board 12 of the control unit. This is the embodiment of FIG. 7. Male edge connector 14' is on board 57.

In FIG. 1, linear contacts upon printed-circuit board 12 constitute a male card edge type connector 14 that engages stationary female connector 11, though other equivalent plug-in type connectors may be employed.

It is also possible to form grooves 51 and beads 52 in spaced sections along the whole extent of frame 50. This allows the control unit to be raised upward into the frame and then be translated longitudinally only a fraction of the length of the control unit to press the same home.

At least one, but typically several controls are available to each passenger. Audio program selector 4 is usually embodied with 12 positions. It is manually rotated by the passenger rotating a thumbwheel. Numerals on the upper periphery indicate the selector (switch) position. A lens may be positioned over the periphery carrying the numerals. The selector may be an EECO #222462-01.

Volume control 5 is typically of the incremental stereo type. It is dual in circuit so that both channels of known stereophonic music and/or sound will be altered in level simultaneously. A peripheral series of separate dots of graded size may indicate the position of the volume control, with the largest dot giving the loudest sound. This control may be an EECO #222814-01.

Stereo loudspeaker-coupler unit 8 has a double acoustic jack 9. The ports of the jack match a tubular double plug (not shown) that is the free end terminus of dual flexible tubes. One tube couples to each ear of the user, like a doctor's stethoscope, which is well known. The loudspeaker-coupler unit may be an EECO #169936-01.

Two other controls are usually provided; switch 6 for the passenger's individual reading light, and switch 7 for calling an attendant. These are usually slide switches.

Switch 6 is the maintained contact type; slide to one position to turn the light on, slide to the opposite position to turn it off. This may be an EECO #222107-03.

Switch 7 is of the three position type. In the central position the circuit is open. In one slid position the attendant is called. In the opposite position the call is cancelled. This may be an EECO #222107-01.

In the embodiment of FIG. 1, flat flexible "ribbon" cable 10 terminates in the seat arm at flat female electrical connector 11, and in the other direction extends through the arm to the main circuits in the vehicle; such as supply the stereo, the reading light, and the attendant call. In the embodiment of FIG. 7 cable 58 is of the usual round type.

Printed Circuit Board ("PCB") 12 is typically disposed horizontally, is supported by, and extends from one side to the other within housing 1. Essentially all electrical elements, such as 4 and 5, are mounted thereon.

More significantly, the right-hand extremity of the PCB, as seen in FIG. 1, is provided with a number of parallel linear contacts 14 that engage corresponding spring contacts within connector 11. This integral configuration reduces weight.

Bracket 15 supports connector 11 on seat arm 2.

Figure 2:
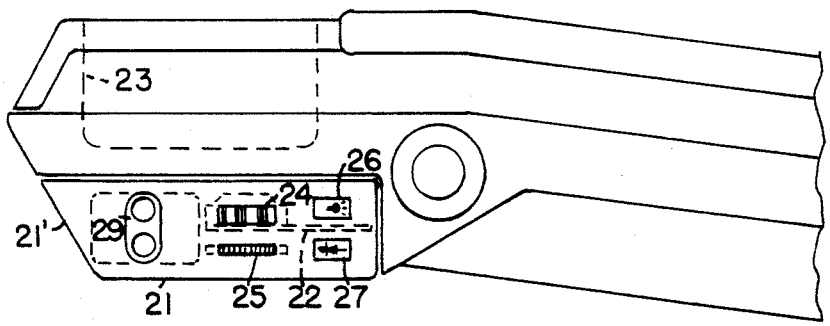
FIG. 2 is substantially the same of an alternate embodiment.

FIG. 2 shows an alternate embodiment of the invention; principally in the exterior shape of the passenger control unit. The internal structure may be the same as in FIG. 1, or PCB 22 may terminate within housing 21 and another form of light-weight connector and cable structure be provided. Controls 24 through 27 and stereo jack 29 are typically the same on all embodiments as the corresponding elements 4 through 7 and 9 of FIG. 1.

Figure 3:
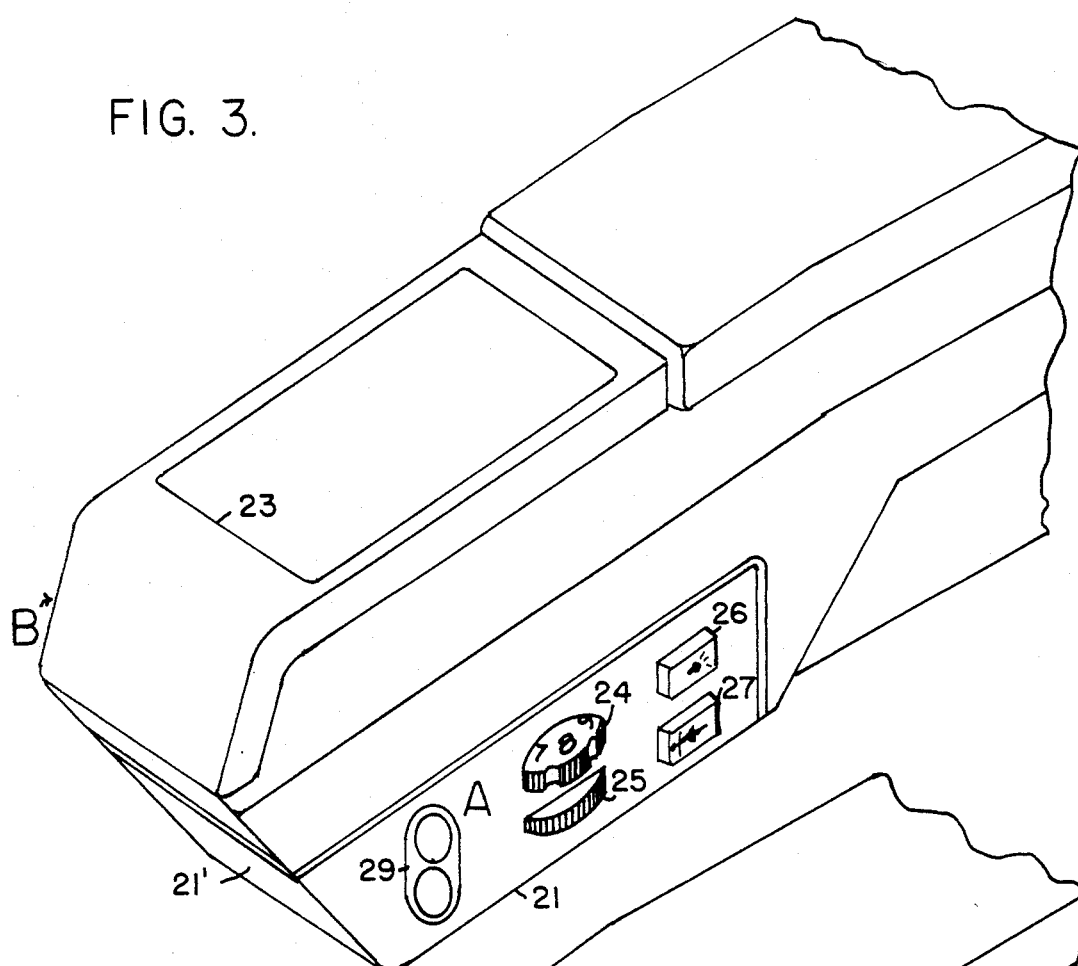
FIG. 3 is a perspective view of the alternate embodiment.

FIG. 3 is a perspective view of the alternate embodiment of FIG. 2. The PCU of side A is in the foreground and serves the user who sits to the left of the seat arm. The PCU of side B is on the opposite side of the arm and so is not seen. It serves the user who sits to the right of the seat arm.

Item 23 is an ash tray for smokers. The under-arm (integrated) embodiment of the PCU allows the ash tray to retain a convenient position on the seat arm; i.e., on the top.

Figure 4:
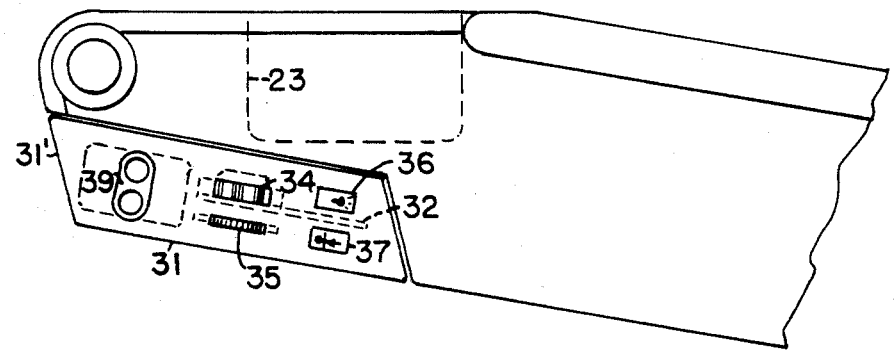
FIG. 4 is a side elevation view of a further under-arm embodiment.

FIG. 4 is yet another under-arm embodiment. The ends of the parallelopiped are modified to fit the arm of another seat manufacturer. The elements are in the 30 series of numerals, and are equivalent to the corresponding elements of the embodiment of FIG. 1.

Figure 5:
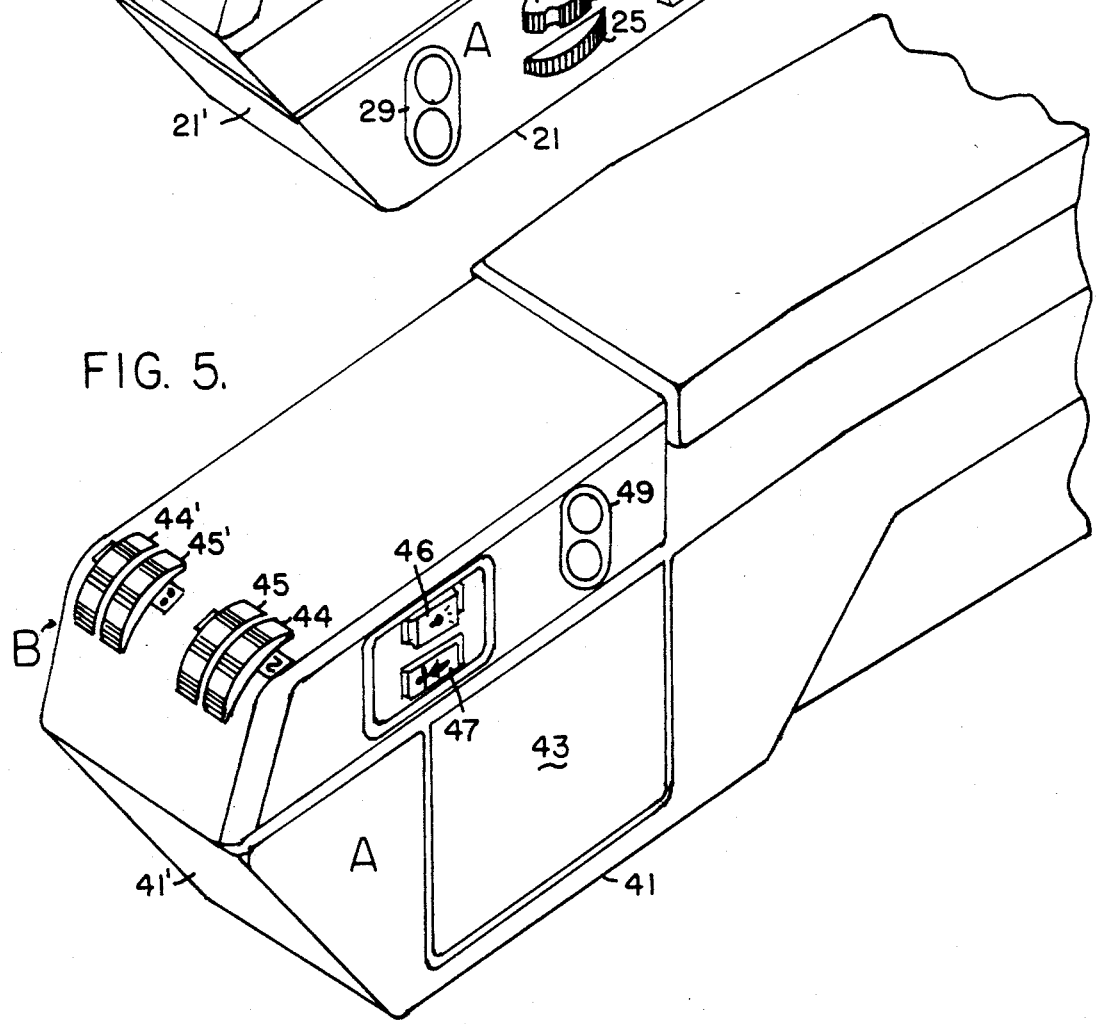
FIG. 5 is a perspective view of an over-arm embodiment.

In the over-arm embodiment of FIG. 5, housing 41 is a rectangular parallelopiped, save for the slant front surface. On near side A, program selector 44 is positioned on the top front, near the edge of the housing. The companion volume control 45 is adjacent.

On far side B, program selector 44' is positioned near the opposite edge of the housing and the companion volume control 45' is adjacent.

All four controls are typically aligned.

On side A, light switch 46 is above and attendant call switch 47 is below; both near the top and forwardly. Jack 49 is near the top and rearwardly. Element 43 is a side-opening ash tray.

In FIG. 5, side B is a duplicate of side A.

The passenger control unit of this invention is thus seen to be capable of a number of embodiments to accommodate secondary factors. However, the essential features of compactness and light weight are retained because of the dual utility of the one unit.

Figure 6:
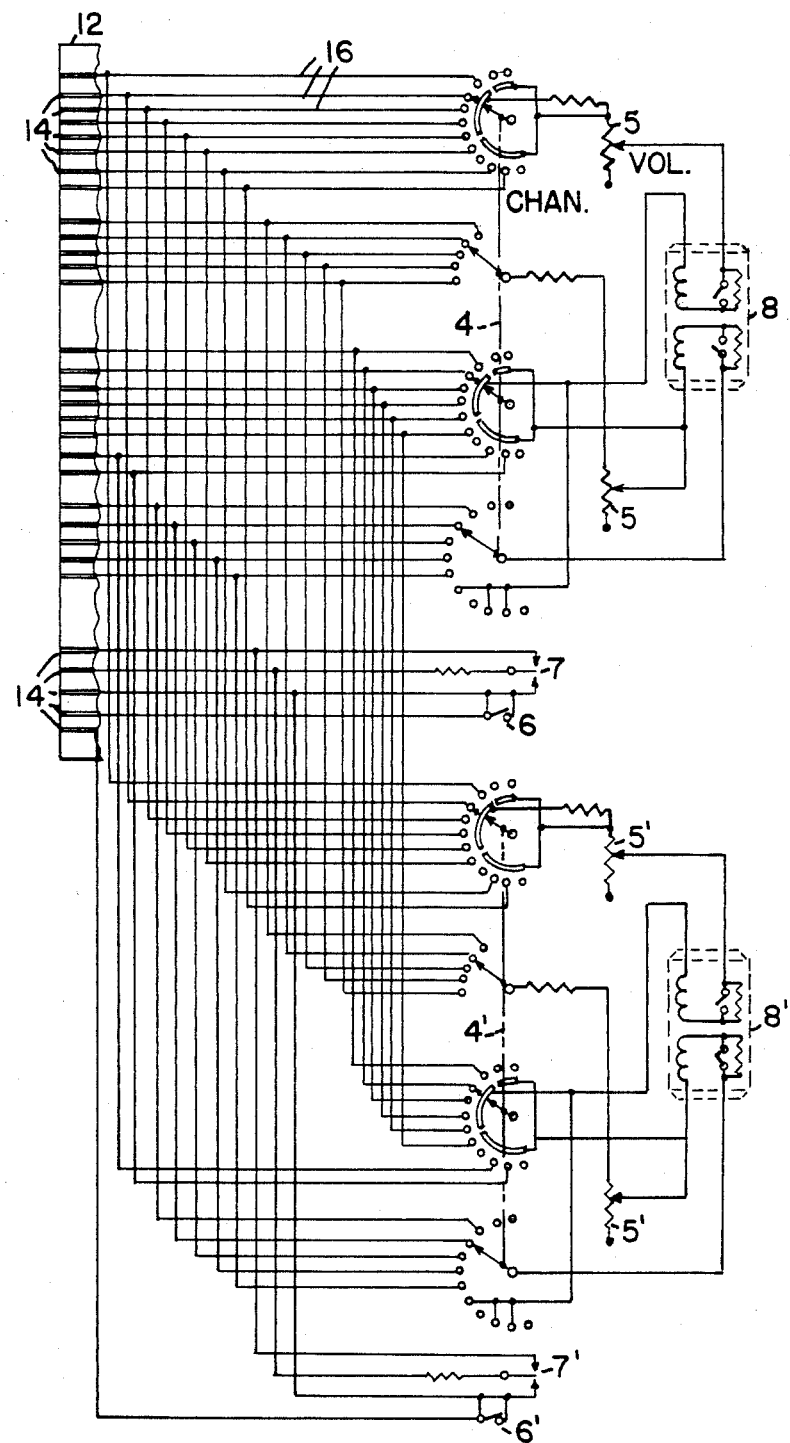
FIG. 6 is a wiring diagram showing the reduction of the number of wires required and the size of the connector.

FIG. 6 gives the schematic internal wiring of printed circuit board 12, and gives a plan view of contacts 14; these being shown in elevation in FIG. 1.

These contacts, and conductors 16, which are typically conductive paths upon the board that are formed by the known printed circuit board technique, connect twelve stereo circuits to program selector 4 in this illustrative example. Because of the required double channel of a stereo circuit, selector 4 is comprised of four ganged switches that are here shown. These are all contained within the illustrative EECO stereo program selector previously mentioned.

The selector connects to volume control 5, which is also dual for stereo, and therethrough to transducer 8, which has two small loudspeaker units to reproduce the stereo sound.

The control circuits for the second passenger are shown in the bottom half of FIG. 6, and are identified by primed (') numerals. Where two corresponding conductors are electrically connected is shown by the conventional black dot, and this occurs for the twelve stereo circuits.

Call and cancel-the-call of the attendant circuits 7 and 7' are similarly joined. This is because it is vehicle practice to merely direct the attendant to the row of seats involved. The passenger desiring attendance is discerned by interrogation on the part of the attendant.

The light switches 6 and 6'; however, must coact with separate lights. Thus, one separate conductor is utilized for each switch.

With this wiring arrangement it is clear that the physical extent of board 12 and the number of contacts 14 need be only one in excess of half of the number of circuits served. Further, the need for two connectors 11 and two cables 10 is eliminated. Only one connector and one cable is needed. Thus, the saving in weight is significant.

While the housing 1, 21, etc. is removably attached to the seat arm in all of the embodiments to allow removal for servicing, it is stationarily attached to the seat arm when it is in use by the passenger(s).

Frame 50 may alternately be a high-strength plastic, such as Ryton.

The above configuration has been discussed with respect to FIG. 1. However, the same configuration can be employed for the alternate embodiments of the other figures as well.

I claim:

1. One passenger control unit to individually serve two adjacently seated passengers that is affixable to a seat arm (2) disposed between the two passengers, comprising;

(a) only one housing (1), essentially symmetrical, side to side, and having two independent sets of external manual controls (4-7), (b) guide means upon said housing and said seat arm for removably stationarily affixing said housing to said seat arm, (c) only one electrical connector means (11), attached to said guide means, (d) one circuit board (12) within said housing, carrying essentially all electrical elements for said two independent sets of external manual controls, (e) only one electrical connector (14) connected to said electrical elements and connectable to said electrical connector means (11), and (f) only one cable (10) carrying conductors for at least one passenger service connected to said electrical connector means (11) to provide independent passenger controls for each passenger for each such passenger service, and having a connection to external means to supply each said passenger service.

2. The passenger control unit of claim 1, in which;

(a) said two independent sets of external manual controls (4-7) are disposed on opposite sides of said passenger control unit.

3. The passenger control unit of claim 2, which additionally includes;

(a) a double acoustic jack (9) on each opposite side of said passenger control unit, subject to independent control by the independent set of external manual controls disposed upon that side of said passenger control unit.

4. The passenger control unit of claim 1, in which;

(a) said housing (1) is a quasi-rectangular hollow parallelopiped, having an end (1') oblique to the end plane of the parallelopiped, and (b) a single horizontally disposed said circuit board (12) that is essentially coextensive with the horizontal extent of said parallelopiped.

5. The passenger control unit of claim 1, in which;

(a) said electrical connector means (11) is at the rear of said guide means.

6. The passenger control unit of claim 1, in which;

(a) said passenger control unit (41) is attached to the top side of said seat arm at the forward extremity thereof, and (b) plural of the controls of said two independent sets of external manual controls (44,45;44',45') are spaced apart on aligned horizontal shafts with only a portion of the circumferential sector of each extending out of the top of said passenger control unit.

7. The passenger control unit of claim 1, in which;

(a) said cable (10) is of the flat ribbon type, (b) said connector means (11) is of the spring contacts card edge type, and (c) said circuit board (12) extends out the rear of the housing (1) and includes contacts (14) to mate with said connector means (11).

8. The passenger control unit of claim 1, in which;

(a) a female connector (11') is attached to said circuit board (12) within said housing, and (b) said electrical connector means attached to said guide means is a male connector means (14').

9. The passenger control unit of claim 1, in which said circuit board (12) includes;

(a) conductors (16,16') disposed upon said circuit board and interconnected to combine the circuits connected to said electrical elements (4,4'), to thereby reduce the number of conductors required in said cable (10).

10. The passenger control unit of claim 1, in which said guide means includes;

(a) a structural frame interface (50), having at least one longitudinal groove (51) to receive, (b) at least one longitudinal projecting bead (52) upon said passenger control unit for fastening said passenger control unit to said frame.

11. The passenger control unit of claim 10, in which;

(a) said longitudinal groove is interrupted to comprise plural spaced short sections of groove, and (b) said longitudinal projecting bead is interrupted to comprise corresponding plural spaced short sections of bead to mate with said spaced short sections of groove, upon said passenger control unit being aligned with said frame and translated within said frame only a fraction of the length of said frame.

12. The passenger control unit of claim 1, which additionally includes means to fasten said guide means to said arm, comprising;

(a) plural locking nuts (54,54') fastened to said seat arm, and (b) plural screws respectively engaging said plural locking nuts through said guide means.

* * * * *